(12) United States Patent
Yokota

(10) Patent No.: US 7,310,114 B2
(45) Date of Patent: Dec. 18, 2007

(54) PICTURE STORAGE DEVICE

(75) Inventor: Akane Yokota, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 10/241,575

(22) Filed: Sep. 12, 2002

(65) Prior Publication Data

US 2003/0122944 A1    Jul. 3, 2003

(30) Foreign Application Priority Data

Dec. 27, 2001  (JP) .............................. 2001-397240

(51) Int. Cl.
*H04N 9/73*   (2006.01)
(52) U.S. Cl. .................................. 348/231.3
(58) Field of Classification Search ............. 348/231.2, 348/231.3
See application file for complete search history.

(56) References Cited

U.S. PATENT DOCUMENTS 6,288,800 B1   9/2001  Izumi .......................... 358/468
6,816,189 B2 * 11/2004  Nagaoka et al. .......... 348/231.2
7,107,516 B1 *  9/2006  Anderson et al. ......... 715/501.1
2002/0051641 A1 *  5/2002  Nagaoka ..................... 396/429
2002/0052886 A1 *  5/2002  Nagaoka ..................... 707/200

FOREIGN PATENT DOCUMENTS

| EP | 0 833 494 A2 | 4/1998 |
| JP | 8-212120 | 8/1996 |
| JP | 10-21130 | 1/1998 |
| JP | 2001-160054 | 6/2001 |

* cited by examiner

*Primary Examiner*—Lin Ye
*Assistant Examiner*—Dillon Durnford-Geszvain
(74) *Attorney, Agent, or Firm*—Fitzpatrick, Cella, Harper & Scinto

(57) ABSTRACT

An image capturing device generates a picture handle for designating a picture file and transmits the picture handle to a picture display device. When an alias corresponding to the picture handle is recorded in a file in a storage medium, the image capturing device transmits the alias. The picture display device displays the received picture handle. By using the picture display device, a user selects a picture handle included in a list and inputs an alias corresponding to the selected picture handle. The input alias is transmitted from the picture display device and is recorded in a file in a storage medium loaded into the image capturing device.

15 Claims, 15 Drawing Sheets

SUNRISE
BIRD
1009999
BASEBALL
1010100
FLOWER

| 1000001 | SUNRISE |
|---------|---------|
| 1000002 | BIRD |
| 1010002 | BASEBALL |
| 9990001 | FLOWER |

PICTURE STORAGE DEVICE

BACKGROUND OF THE INVENTION

1. Field of the Invention

The present invention relates to a picture storage device linkable to a data input device.

2. Description of the Related Art

The names of files of pictures stored in a digital still camera are determined in accordance with a predetermined camera file system employed by the digital still camera, such as the Design rule for Camera File system (DCF) by the Japan Electronic Industry Development Association (JEIDA).

FIG. 1 shows an example a file system for storing picture files in accordance with the DCF.

As shown in FIG. 1, in the DCF, under a root directory 1301, a digital camera images (DCIM) directory 1302 is formed, and below the DCIM directory 1302, each directory 1303 (hereinafter referred to as the "DCF directory 1303") is formed. Below the DCF directory 1303, each picture file is stored as each file 1304 (hereinafter referred to as the "DCF file 1304") which is named in accordance with predetermined rules.

A DCF directory name assigned to the DCF directory 1303 consists of eight characters. The first to third characters are numbers that are not repeated, that is, "100" to "999". These numbers are called "directory numbers". In each directory number, the fourth to eighth characters are arbitrary one-byte capital alphabetic characters.

A DCF directory name assigned to the DCF directory 1304 consists of a three-character extension and an eight-character file name. In this file name, the first to fourth characters take an arbitrary character string using only one-byte numerals and capital alphabetic characters. The fifth to eighth characters take numbers from "0001" to "9999". These numbers are hereinafter referred to as "file numbers". The three-character extension represents an image format type. FIG. 1 shows a case in which the image format type represents the JPEG (Joint Photographic Experts Group) format. When the image format type is the JPEG format, the extension is "JPG".

In addition, below the root directory 1301, a directory having a directory name other than a DCF directory name may be formed. FIG. 1 shows that a directory 1305 having the directory name "MISC" is formed.

An image captured by a digital still camera can be played back by another digital still camera if both cameras employ a file system such as the DCF.

Also, recently, there is great need to play back images stored in a digital still camera by using an image playback device other than the digital still camera, such as a cellular phone or a personal digital assistant.

In order to play back an image by means of an image playback device into which a removal memory cannot be loaded, a method which provides close-range radio-communication means to a digital still camera and the image playback device has been proposed. In this method, by using the close-range radio communication to establish a link between the digital still camera and the image playback device, the image stored in the digital still camera can be played back by the image playback device.

In general, the image playback device does not support a file system in accordance with a predetermined camera file system such as the DCF. Thus, when the image stored in the digital still camera is played back by the image playback device by using the close-range radio communication, both the digital still camera and the image playback device must be provided with rules that can uniquely determine an image file.

By way of example, as FIG. 2 shows, by designating an image file 1401 by using a series of figures composed of directory numbers and file numbers, the image file 1401, which is named in accordance with the DCF, can uniquely be determined.

Image file names determined by the series of figures (1402) composed of the directory numbers and the file numbers are hereinafter referred to as "image handles 1402". Since the directory numbers are unique values, by designating one of the image handles 1402 composed of the directory numbers and the file numbers, a short length of seven numerals can specify an image.

The image playback device uses the close-range radio communication to link to the digital still camera, and can play back a desired image by using one of the image handles 1402 for image designation.

Nevertheless, in the case in FIG. 2, if the image handle 1402 for use in designating the desired image is referred to, the content of the desired image cannot be known until it is played back since the image handle 1402 is constituted by only numerals.

SUMMARY OF THE INVENTION

It is an object of the present invention to facilitate operability by performing an operation such as picture retrieval.

It is another object of the present invention to improve operability for recording a picture alias.

It is another object of the present invention to enable a user to perform a picture operation by using an alias.

It is a further object of the present invention to enable a device in accordance with predetermined rules to perform picture operation, even if the device cannot perform the picture operation by using an alias.

To these ends, according to an aspect of the present invention, a picture storage device linkable to a data input device is provided. The picture storage device includes an output unit for outputting picture identification information, a receiving unit for receiving a picture name from the data input device, and a recording unit for recording the received picture name corresponding to the picture identification information. The output unit outputs the picture name when the picture name corresponding to the picture identification is recorded.

According to another aspect of the present invention, a data recording program for a picture storage device linkable to a data input device is provided. The data recording program includes the steps of outputting picture identification information, receiving a picture name from the data input device, and recording the received picture name corresponding to the picture identification information. In the outputting step, when a picture name corresponding to the picture identification information is recorded, the picture name is output.

Further objects, features, and advantages of the present invention will become apparent from the following description of the preferred embodiments with reference to the attached drawings.

BRIEF DESCRIPTION OF THE DRAWINGS

FIG. 10 is an illustration of an example of the content of a picture handle list generated by the image capturing device 100 shown in FIG. 3.

FIG. 15 is an illustration of an example of the content of a file storing the picture handles and alias conversion table in the image capturing device 100 shown in FIG. 3.

DESCRIPTION OF THE PREFERRED EMBODIMENTS

A picture communication system according to an embodiment of the present invention is described below with reference to the accompanying drawings.

This embodiment describes a case in which a picture stored in an image capturing device 100 (picture storage device) is operated by a picture display device 300 (data input device).

Preferably, the image capturing device 100 is one that can use pictures stored in a removable memory, such as a digital still camera or a digital video camera. In the following description, a digital still camera is used as the image capturing device 100. The picture display device 300 is preferably a device having data-input operability better than that of the image capturing device 100, such as a cellular phone, a PDA, or a computer. In the following description, a cellular phone is used as the picture display device 300.

Figure 3:
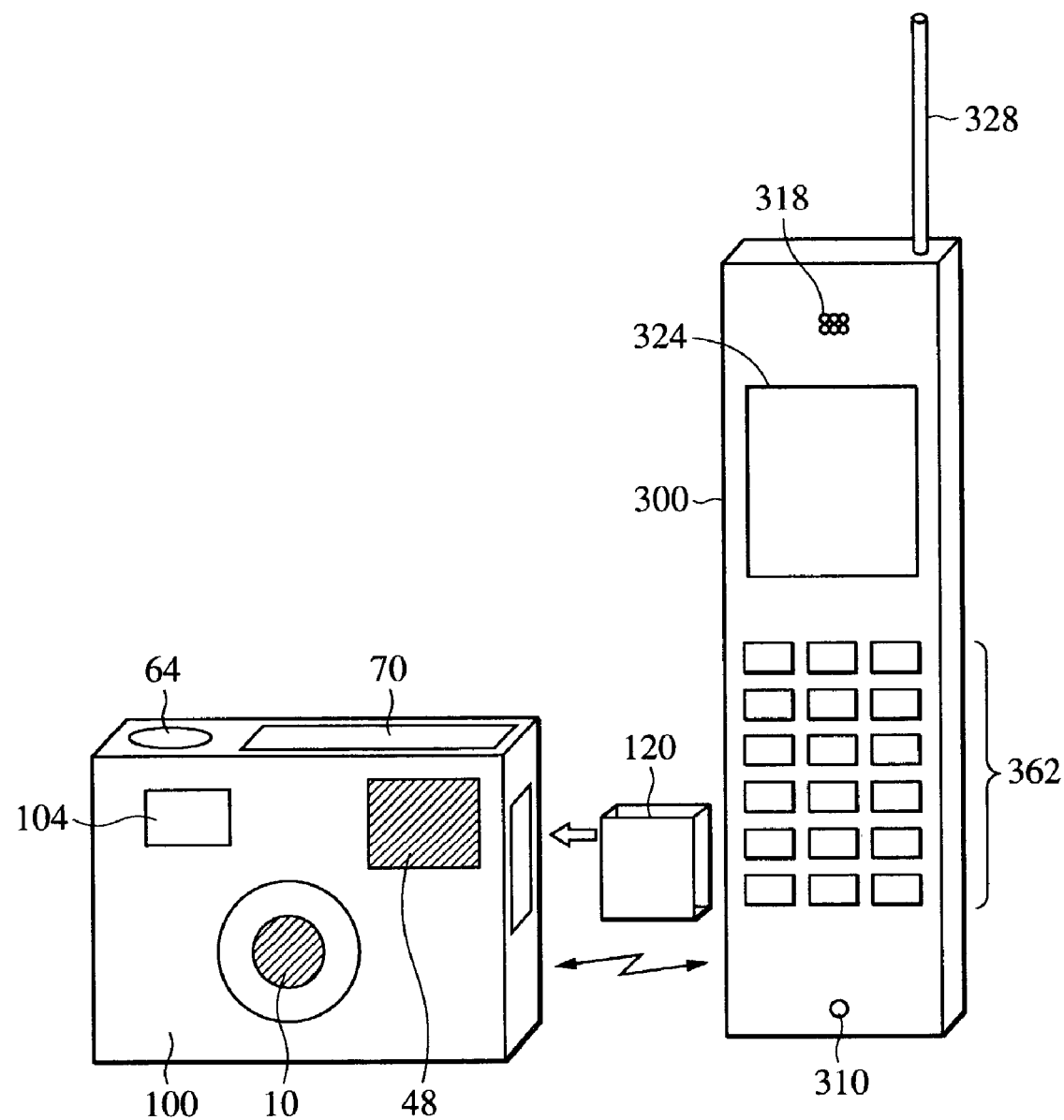
FIG. 3 is an illustration of the overall configuration of a picture communication system according to an embodiment of the present invention.

Referring to FIG. 3, the image capturing device 100 and the picture display device 300 can mutually transmit and receive data which includes commands and captured pictures by using spread spectrum communication as a close-range radio-communication method. In another modification, both can mutually transmit and receive data including commands and captured pictures by using infrared communication.

As shown in FIG. 3, the image capturing device 100 includes, in portions of its housing, a capturing lens 10, a flash unit 48, a shutter button 64, an operation unit 70, an optical finder 104. The picture display device 300 includes, in portions of its housing, a microphone 310, a speaker 318, an antenna 328, a display unit 324, and an operation unit 362. The image capturing device 100 also includes a slot and can accommodate a storage medium 120 in the slot.

Close-range radio communication is executed between a close-range radio-communication circuit 110 built into the image capturing device 100 and a close-range radio-communication circuit 330 built into the picture display device 300.

Figure 4:
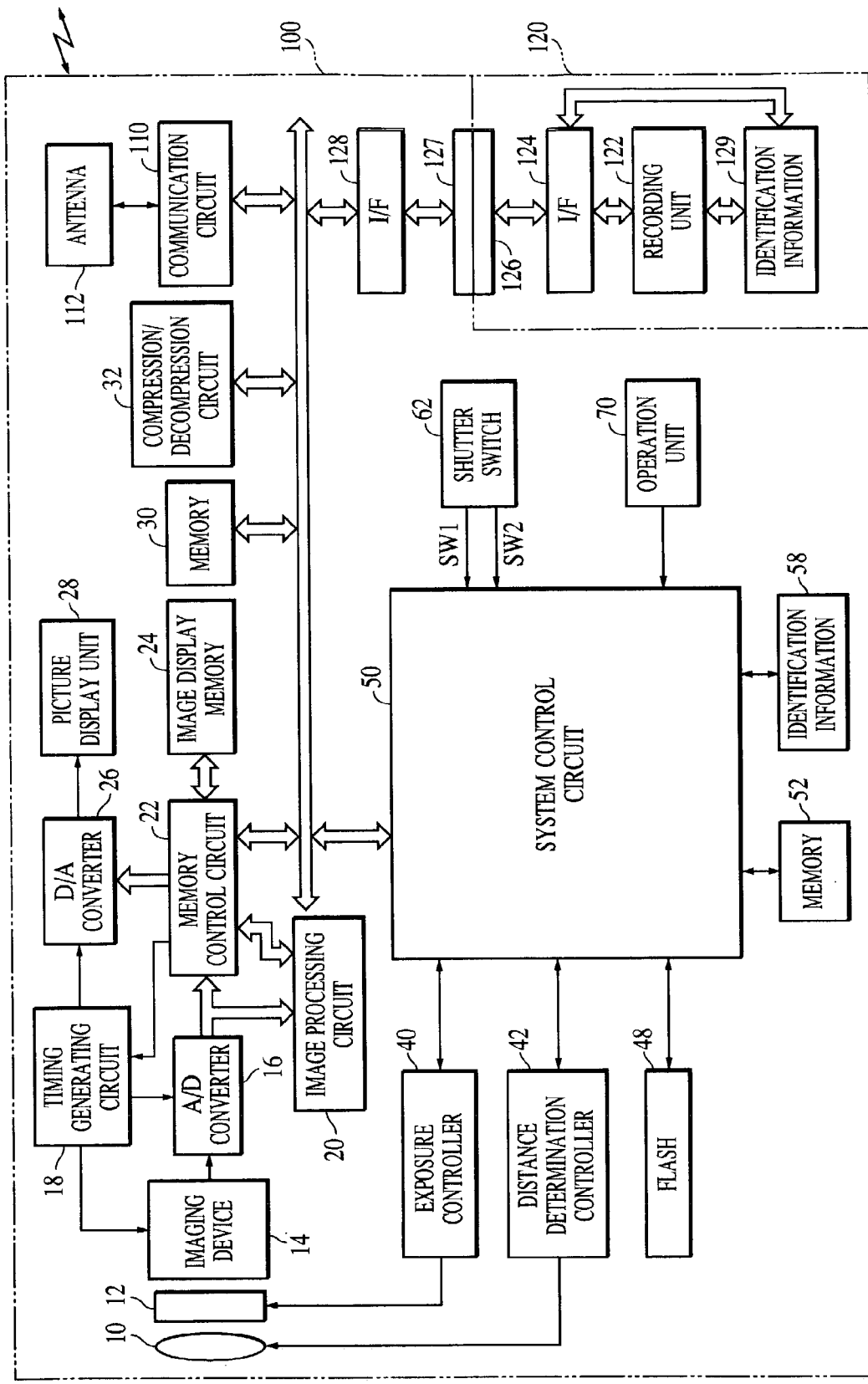
FIG. 4 is a schematic block diagram showing the image capturing device 100 shown in FIG. 3.

FIG. 4 is a schematic block diagram showing the image capturing device 100 (picture storage device) shown in FIG. 3. The image capturing device 100 can write data into a removable storage medium 120 and can read stored data from the storage medium 120.

In FIG. 4, the capturing lens 10 captures an optical image of a subject. A shutter 12 has an aperture stop function. An imaging device 14 converts the optical image captured through the capturing lens 10 into electric signals as analog signals. An analog-to-digital (A/D) converter 16 converts the analog signals into digital signals as data.

The data from the A/D converter 16 is written into a picture display memory 24 or a memory 30 either through an image processing circuit 20 and a memory control circuit 22 or through the memory control circuit 22. The data written in the picture display memory 24 is displayed on a picture display unit 28 by a digital-to-analog (D/A) converter 26.

A timing generating circuit 18 supplies a clock signal and a control signal to the imaging device 14, the A/D converter 16, and the D/A converter 26.

The image processing circuit 20 uses the data of the captured image to perform arithmetic processing. Based on the obtained result of the arithmetic processing, a system control circuit 50 performs automatic focus processing and automatic exposure processing that control an exposure controller 40 and a distance determination controller 42.

A memory 30 stores captured still pictures and moving pictures. The memory 30 can store information received from the picture display device 300 through a close-range radio-communication circuit 110. The memory 30 can be used as a work area for the system control circuit 50.

A compression/decompression circuit 32 reads a picture stored in the memory 30, processes the picture for compression or decompression, and writes the processed data into the memory 30.

The system control circuit 50 controls the entirety of the image capturing device 100. A memory 52 stores constants, variables, programs, etc., for the operations of the system control circuit 50.

An identification information unit 58 stores various types of identification information for authentication performed before the image capturing device 100 communicates with the picture display device 300 by using the close-range radio-communication circuit 110 and an antenna 112.

A shutter switch 62 includes switches SW1 and SW2. The switch SW1 is turned on while a shutter button 64 is being operated, and issues instructions to start processes such as an automatic focus process, an automatic exposure process, an automatic white balance process, and an evaluative flash. The switch SW2 is turned on when the operation of the shutter button 64 is completed, and issues an instruction to start consecutive processes including an exposure process in which a picture signal 14 read from the imaging device 14 is written in the memory 30 through the A/D converter 16 and the memory control circuit 22, a development process using arithmetic operations performed in the image processing circuit 20 and the memory control circuit 22, and a recording process in which picture data read from the memory 30 is compressed by the compression/decompression circuit 32 and is written into the storage medium 120.

The operation unit 70 includes mode dial switches and set buttons for switching to and setting each functional mode such as a picture-capture mode, a playback mode, or a personal-computer link mode.

The close-range radio-communication circuit 110 has various close-range high-speed data-communication functions such as spread spectrum communication. The antenna 112 is used to link to another device by using the close-range radio-communication circuit 110. The close-range radio-communication circuit 110 has a means for transmitting radio signals from the antenna 112 to another device and a means for receiving radio signals from another device through the antenna 112.

An interface (I/F) 128 serves as an interface with the storage medium 120 such as a memory card or a hard disk. A connector 127 is used for connection to the storage medium 120 such as a memory card or a hard disk.

As to the interface 128 and the connector 127, cards in accordance with standards, such as a PCMCIA (Personal Computer Memory Card International Association) card, a compact flash (CF) card, and a multimedia card (MMC), may be used.

In a form in which those in accordance with the standard, such as a PCMCIA card and a CF card is used as the interface 128 and the connector 127, by connecting each type of communication card such as a LAN (local area network) card, a modem card, a USB (Universal Serial Bus interface) card, an IEEE (Institute of Electrical and Electronic Engineers) 1394 card, a P1284 card a SCSI (small computer system interface) card, or a PHS (personal handy-phone system) card, picture data and management information associated therewith can be mutually transferred between the image capturing device 100 and a peripheral unit such as a computer or a printer. In this form, not only the close-range radio-communication circuit 110, but also another communication means is used to enable communication with another device. The close-range radio-communication circuit 110 may be connected to the image capturing device 100 by the connector 127.

A memory card, a hard disk, or the like, is used as the storage medium 120. The storage medium 120 has a recording unit 122 formed by a semiconductor memory or a magnetic disk, an interface 124 with the image capturing device 100, a connector 126 for connecting to the image capturing device 100, and identification information 129.

Figure 1:
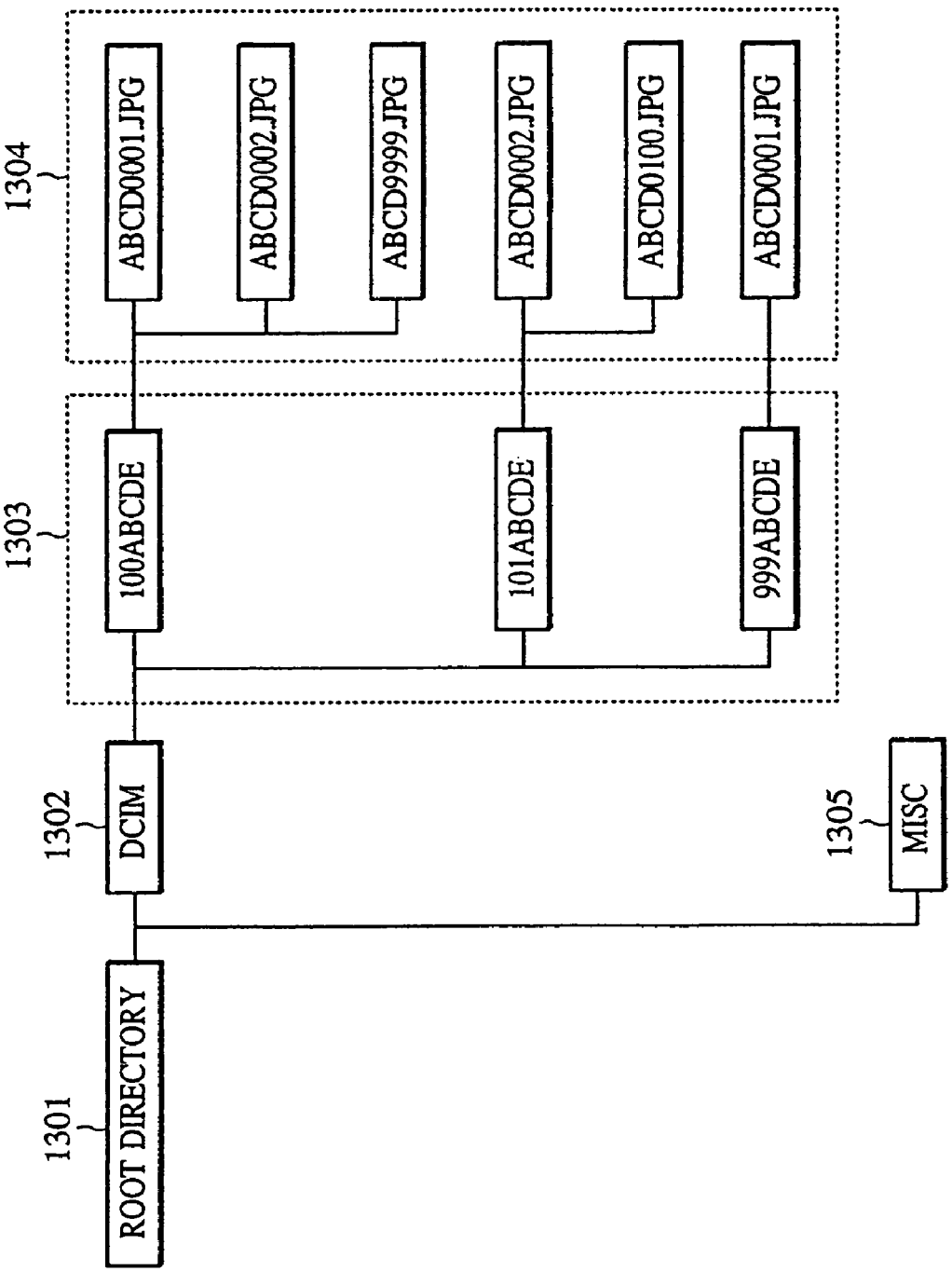
FIG. 1 is a block diagram showing an example of a file system employed by an image capturing device.
Figure 2:
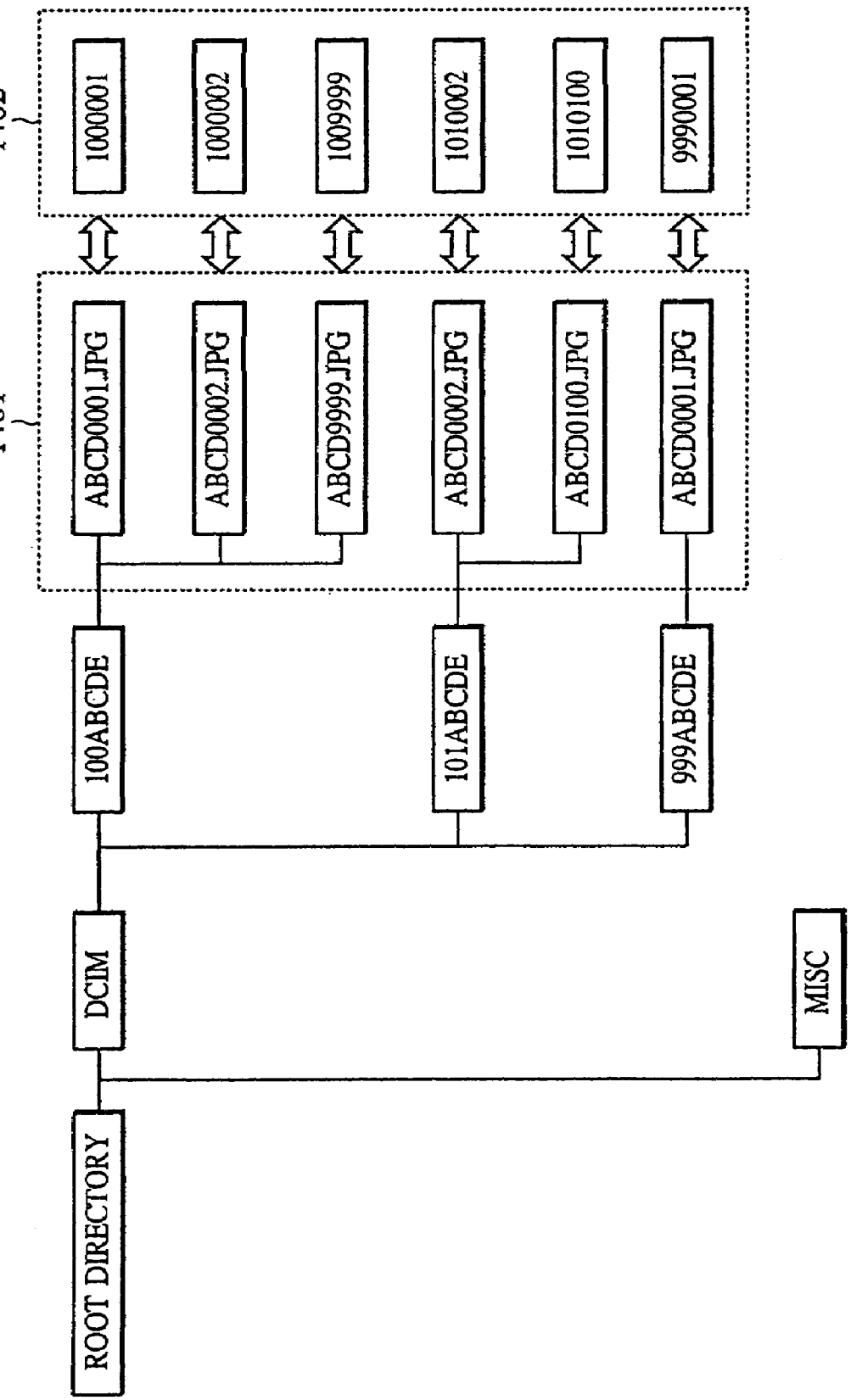
FIG. 2 is a block diagram illustrating a method for uniquely determining a picture file named by a file system employed by an image capturing device.
Figure 5:
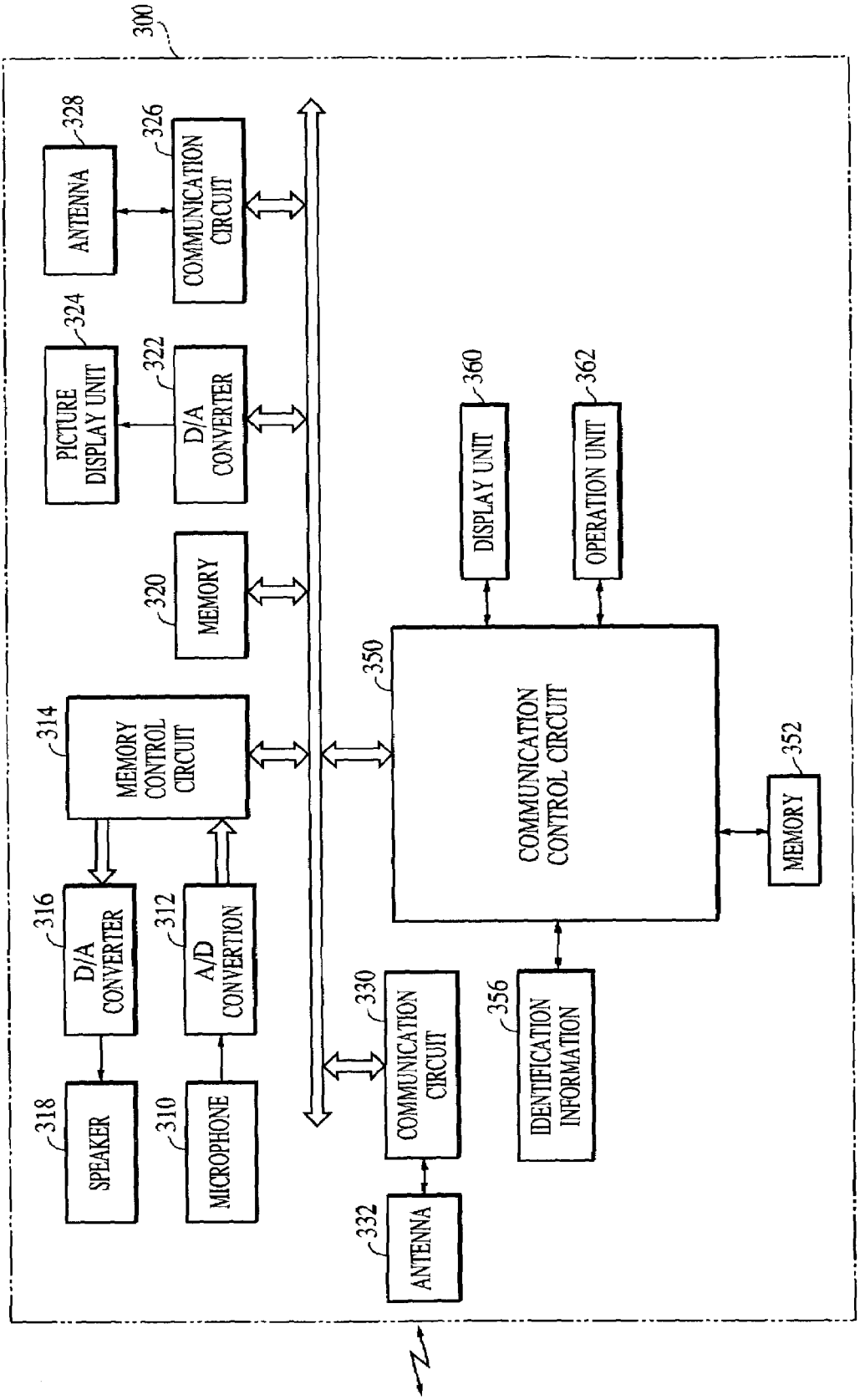
FIG. 5 is a detailed block diagram showing the picture display unit 300 shown in FIG. 3.
Figure 6:
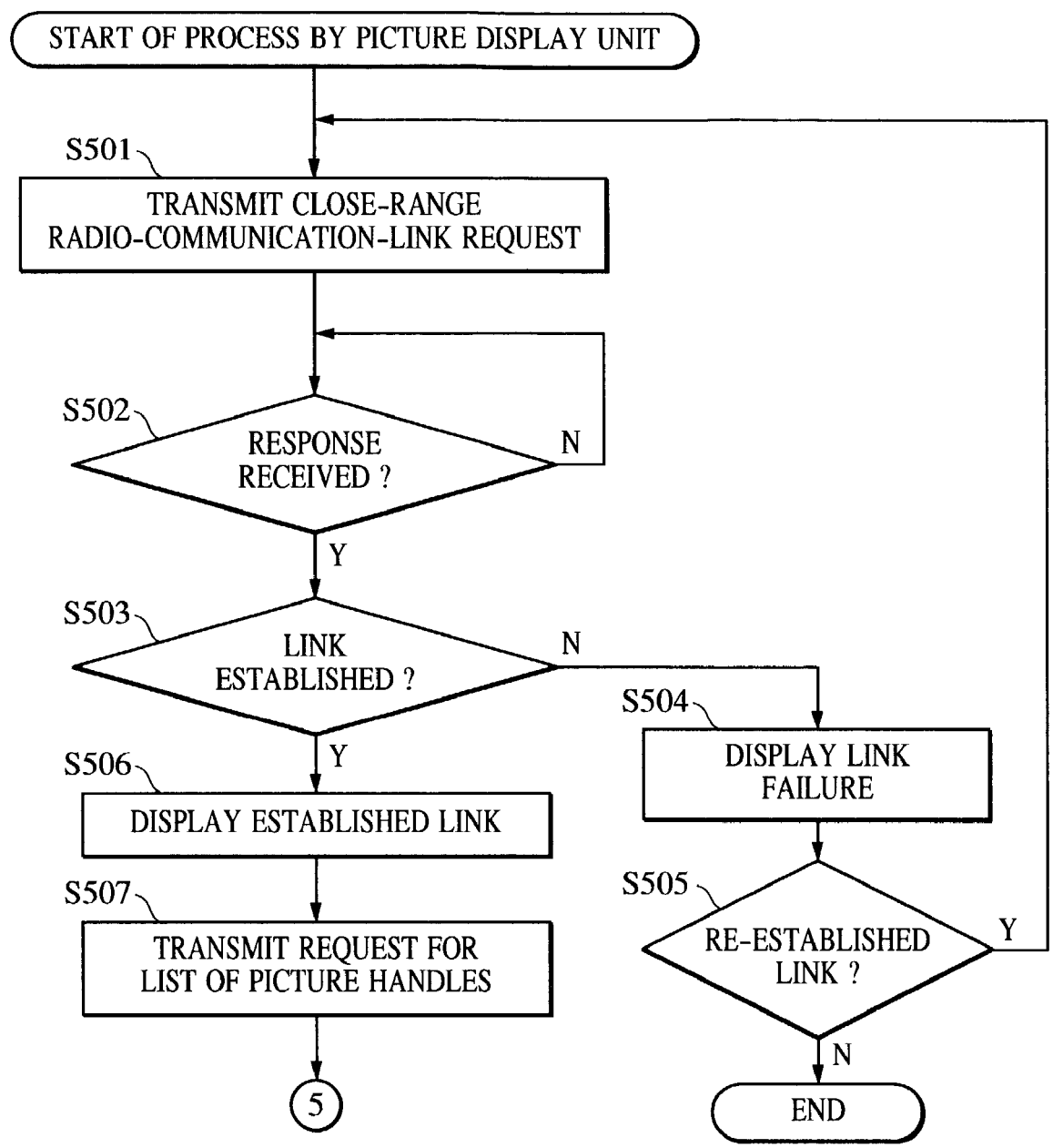
FIG. 6 is a flowchart showing an alias setting process of the picture display unit 300 shown in FIG. 3.
Figure 7:
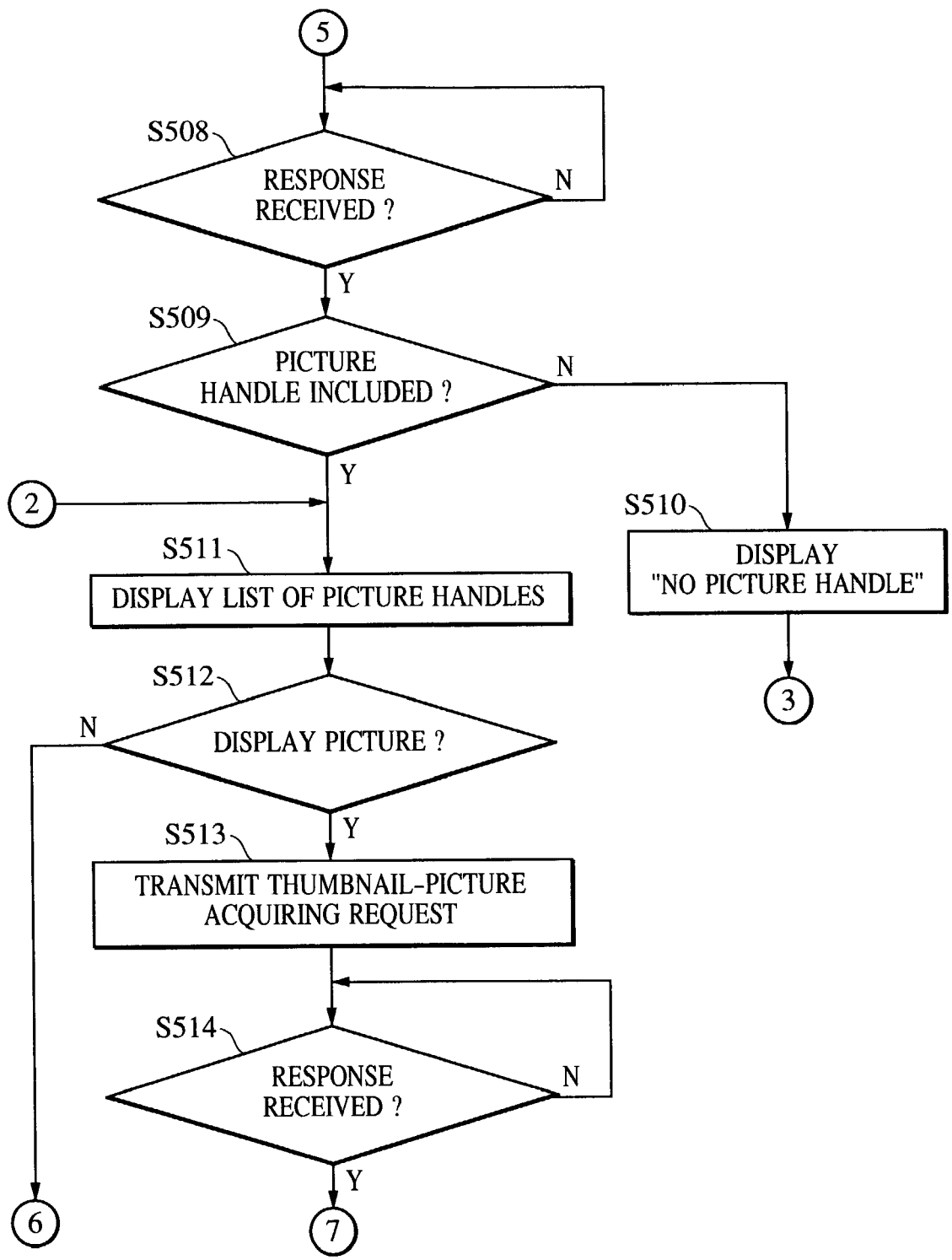
FIG. 7 is a flowchart continued from the flowchart shown in FIG. 6 which shows the alias setting process of the picture display unit 300 shown in FIG. 3.
Figure 8:
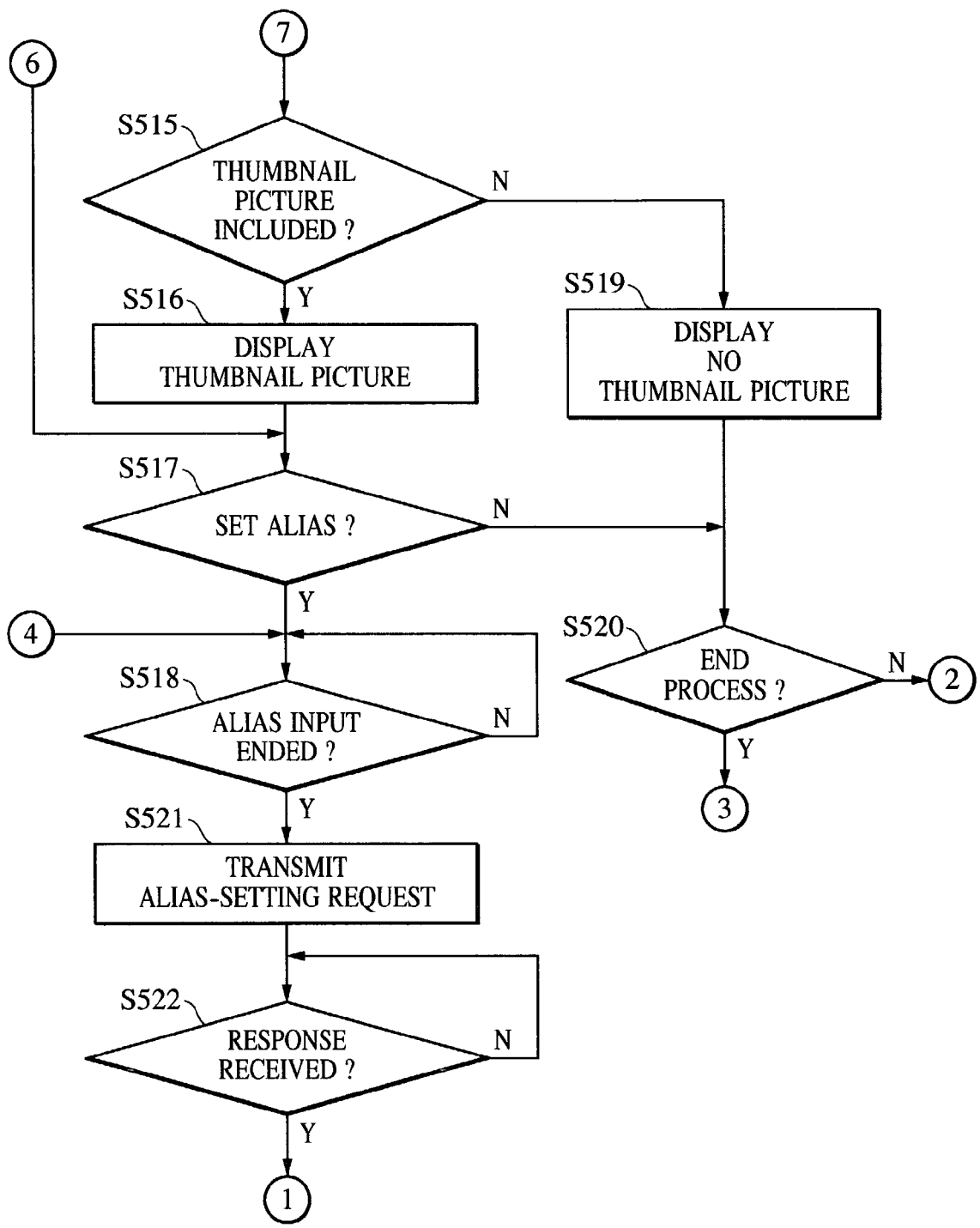
FIG. 8 is a flowchart continued from the flowchart shown in FIG. 7 which shows the alias setting process of the picture display unit 300 shown in FIG. 3.
Figure 9:
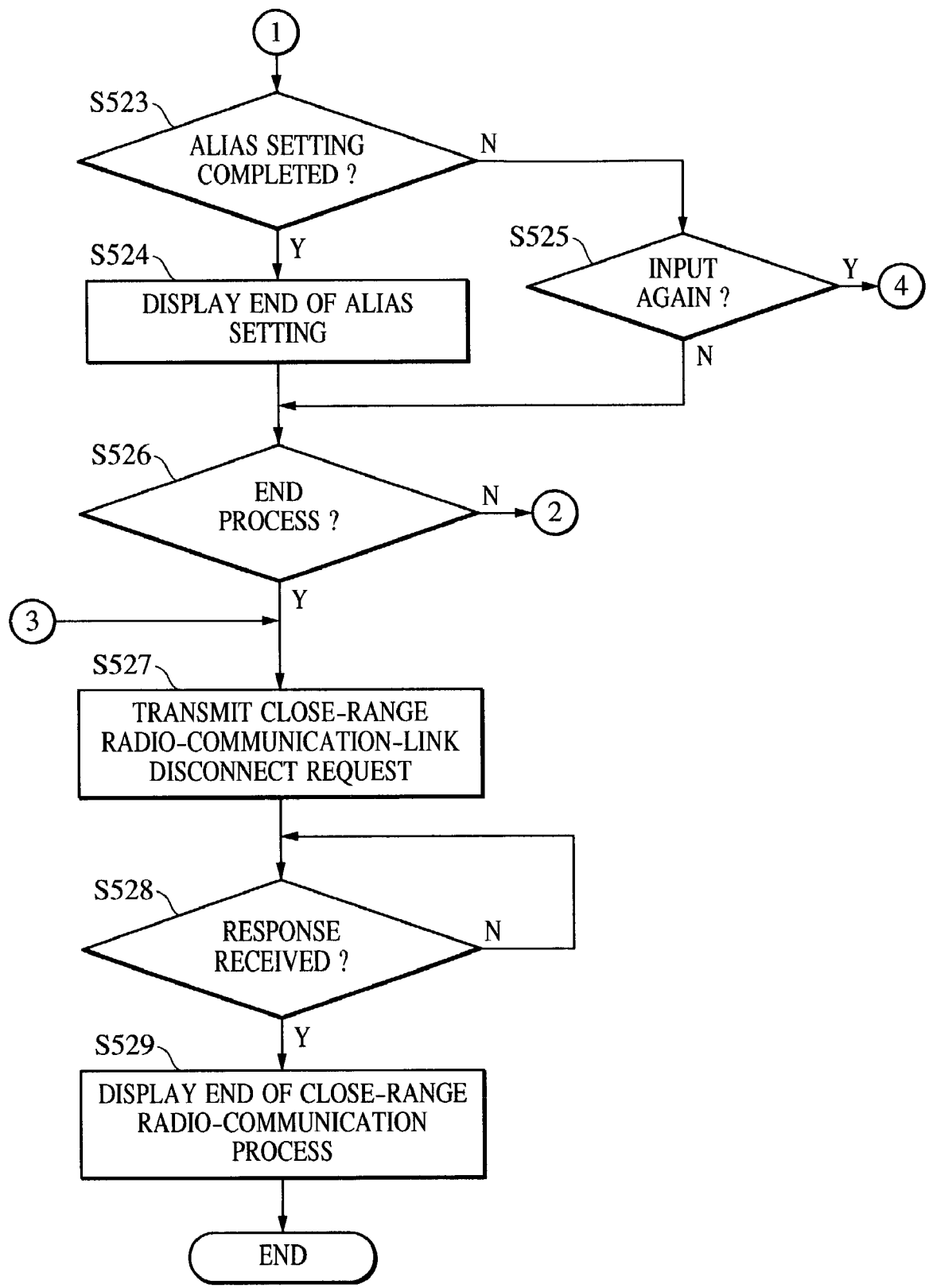
FIG. 9 is a flowchart continued from the flowchart shown in FIG. 8 which shows the alias setting process of the picture display unit 300 shown in FIG. 3.

FIG. 5 is a detailed block diagram showing the picture display device 300 (data input device) in FIG. 1.

Referring to FIG. 5, the microphone 310 converts sound into electric signals as analog signals. An A/D converter 312 converts the analog signals output from the microphone 310 into digital signals. A memory control circuit 314 controls writing into a memory 320 of data (signals) output from the A/D converter 312 and inputting into a D/A converter 316 of data (signals) read from the memory 320. The D/A converter 316 converts digital signals into analog signals. A speaker 318 converts electric signals into audio signals.

The memory 320 stores the sound input from the microphone 310 and/or still or moving pictures transmitted from the image capturing device 100. The D/A converter 322 converts the still or moving picture data stored in the memory 320 into analog signals. A picture display unit 324 displays picture signals output from the D/A converter 322.

A network communication circuit 326 has various radio telecommunication functions such as Time Division Multiple Access (TDMA), Code Division Multiple Access (CDMA), and Wide-band Code Division Multiple Access (W-CDMA). An antenna 328 is used when the network communication circuit 326 controls the picture display unit 300 to link to another communication unit (not shown) or base transceiver station (not shown).

A close-range radio-communication circuit 330 has various close-range high-speed data-communication functions. An antenna 332 is used when the close-range radio-communication circuit 330 controls the picture display device 300 to link to another device. The close-range radio-communication circuit 330 includes a means for transmitting radio signals to another device through the antenna 332 and a means for receiving radio signals from another device through the antenna 332.

A communication system control circuit 350 controls the entirety of the picture display device 300. A memory 352 stores constants, variables, programs, etc., for the operations of the communication system control circuit 350.

An identification information unit 356 stores various types of identification information for authentication performed before the picture display device 300 communicates with the image capturing device 100 by using the close-range radio-communication circuit 330 and the antenna 332. At least one display unit 360 includes a speaker for generating sound and a liquid crystal display for displaying characters (message) and images in order to display an operating state. One or more display units 360 are provided in the picture storage devices 300, and each device is formed by, for example, a combination of a liquid crystal display, a light-emitting device, and a sound-generating device.

The operation unit 362 is used to input various operation instructions for the communication system control circuit 350, and is formed by at least one switch, at least one dial, at least one touch panel, at least one sound recognition unit, etc., in combination. By using the operation unit 362, operations can be performed, such as switching on and off of the picture display device 300, execution (off-hooking) and termination (on-hooking) of calling, telephone number inputting, telephone number retrieval, and communication mode switching.

As described above, the image capturing device 100 in FIG. 4 store, on the storage medium 120, picture data captured by using the capturing lens 10, and can transmit the picture data to the picture display device 300 in FIG. 5 by using the close-range radio-communication circuit 110 and the antenna 112. The picture display device 300 can display, on the picture display unit 324, the picture data received by using the antenna 322 and the close-range radio-communication circuit 330.

Also, the image capturing device 100 can record, on the storage medium 120 of a removable type, information received from the picture display device 300 through the close-range radio-communication circuit 110, and can display the information on the picture display unit 28.

An alias setting process of the picture communication system having the above-described structure is described below.

FIGS. 6 to 9 are flowcharts showing an alias setting program executed by the picture display device 300 (data input device). The alias setting program is stored in the memory 352 and is executed by the communication system control circuit 350. The communication system control circuit 350 is a computer for reading the alias setting program from the memory 352 and executing the read program. The memory 352 is a storage medium storing the alias setting program so that it can be read by the communication system control circuit 350. A process which is performed by the picture display device 300 under control of the communication system control circuit 350 and which executes the alias setting program is described below.

When the operation unit 362 is used to select the operation of setting an alias, the picture display device 300 uses the close-range radio-communication circuit 330 to transmits a close-range radio-communication-link request to the image capturing device 100 (step S501), and waits for the close-range radio-communication circuit 330 to receive a close-range radio-communication-link response from the image capturing device 100 (step S502).

After receiving the close-range radio-communication-link response, the picture display device 300 verifies the content of the received response about whether or not the link is established (step S503). When the link is not established, the picture display device 300 displays a link failure on the display unit 360 (step S504), and displays, on the display unit 360, a message for querying a user about whether to establish a link again (step S505). When the operation unit 362 is used to select the operation of establishing a link again, the picture display device 300 repeatedly performs the steps from S501. If the operation of establishing the link again is selected in step S505, the picture display device 300 terminates the process.

If it is determined in step S503 that the close-range radio-communication link has been established, the state in which the link is established is displayed on the display unit 360 (step S506). The picture display device 300 transmits a request for a list of picture handles from the close-range radio-communication circuit 330 to the image capturing device 100 (step S507). The picture display device 300 waits for the close-range radio-communication circuit 330 to receive a response to the request for the list of picture handles from the image capturing device 100 (step S508).

After receiving the response to the request for the list of picture handles in step S508, the picture display device 300 verifies whether or not the response includes a picture handle (step S509). When no picture handle is included, the picture display device 300 displays, on the display unit 360, a screen indicating that no picture handle is included (step S510), and executes a close-range radio-communication-link disconnect process (described later) from step S527.

When it is determined in step S509 that the list of picture handles is included in the response, the list of picture handles is displayed on the display unit 324 (step S511). If the list of picture handles includes a desired picture to be displayed, the display unit 360 displays a screen for selecting a picture handle. The list of picture handles displayed in step S511 is, for example, the list 820 of picture handles shown in FIG. 10.

When a picture handle is selected by using the operation unit 362 (step S512), the picture display device 300 transmits a thumbnail-picture acquiring request from the close-range radio-communication circuit 330 to the image capturing device 100 (step S513), and waits for the close-range radio-communication circuit 330 to receive a response to the request (step S514).

After receiving the response to the thumbnail-picture acquiring request from the image capturing device 100, the picture display device 300 verifies whether or not the received response includes a thumbnail picture (step S515). When no thumbnail picture is included, the picture display device 300 displays a screen indicating no thumbnail picture on the display unit 360 (S519), and displays, on the display unit 360, a screen for querying the user about whether to terminate the process (step S520). When the termination of the process is selected, the picture display device 300 executes the close-range radio-communication-link disconnect process (described later) from step S527. When continuation of the process is selected, the picture display device 300 repeatedly performs the steps from step S511.

When it is determined in step S515 that a thumbnail picture is included, the thumbnail picture is displayed on the display unit 324 (step S516). After step S516, when the operation of displaying the picture is not selected in step S512, the display unit 360 displays a screen for querying whether or not an alias is set for the selected picture handle (step S517). When setting of the alias is not selected by using the operation unit 362, the steps from S520 are executed.

When the setting of the alias for the selected picture handle is selected in step S517, the end of inputting of the alias by using the operation unit 362 is awaited (step S518). For example, the user selects the picture handle "1009999" from the list 820 of picture handles shown in FIG. 10, and inputs, for example, "BIRTHDAY" as a corresponding alias by using the keyboard portion of the operation unit 362. When the picture is displayed in step S516, it is the selected picture.

After the inputting of the alias ends, an alias setting request including the picture handle "1009999" for which the alias is set, and the alias "BIRTHDAY" is transmitted from the picture display device 300 to the image capturing device 100 (step S521), and the picture display device 300 waits for the close-range radio-communication circuit 330 to receive a response to the request (step S522). After receiving the response to the alias setting request from the image capturing device 100, the picture display device 300 determines whether or not the setting of the alias is completed by verifying the content of the received response (step S523). When the setting of the alias is completed, the picture display device 300 displays the end of alias setting on the display unit 360 (step S524).

When it is determined in step S523 that the setting of the alias is not completed, the display unit 360 displays a screen for querying the user about setting of the alias again (step S525). When the setting of the alias is selected by using the operation unit 362, the picture display device 300 repeatedly performs the steps from S518.

After step S524 is executed, when the setting of the alias again is not selected in step S525, the display unit 360 displays a screen for querying the user about whether to end the setting of the alias (step S526). When the alias setting process does not end, the steps from step S511 are repeatedly executed.

When the termination of the alias setting process is selected in step S526, the picture display device 300 transmits a close-range radio-communication-link disconnect request from the close-range radio-communication circuit 330 to the image capturing device 100 (step S527). After receiving the response to the close-range radio-communication-link disconnect request from the image capturing device 100 (step S528), the picture display device 300 displays the end of the close-range radio communication on the display unit 360 and terminates the process.

Next, an alias setting process of the image capturing device 100 (picture storage device) is described below.

Figure 11:
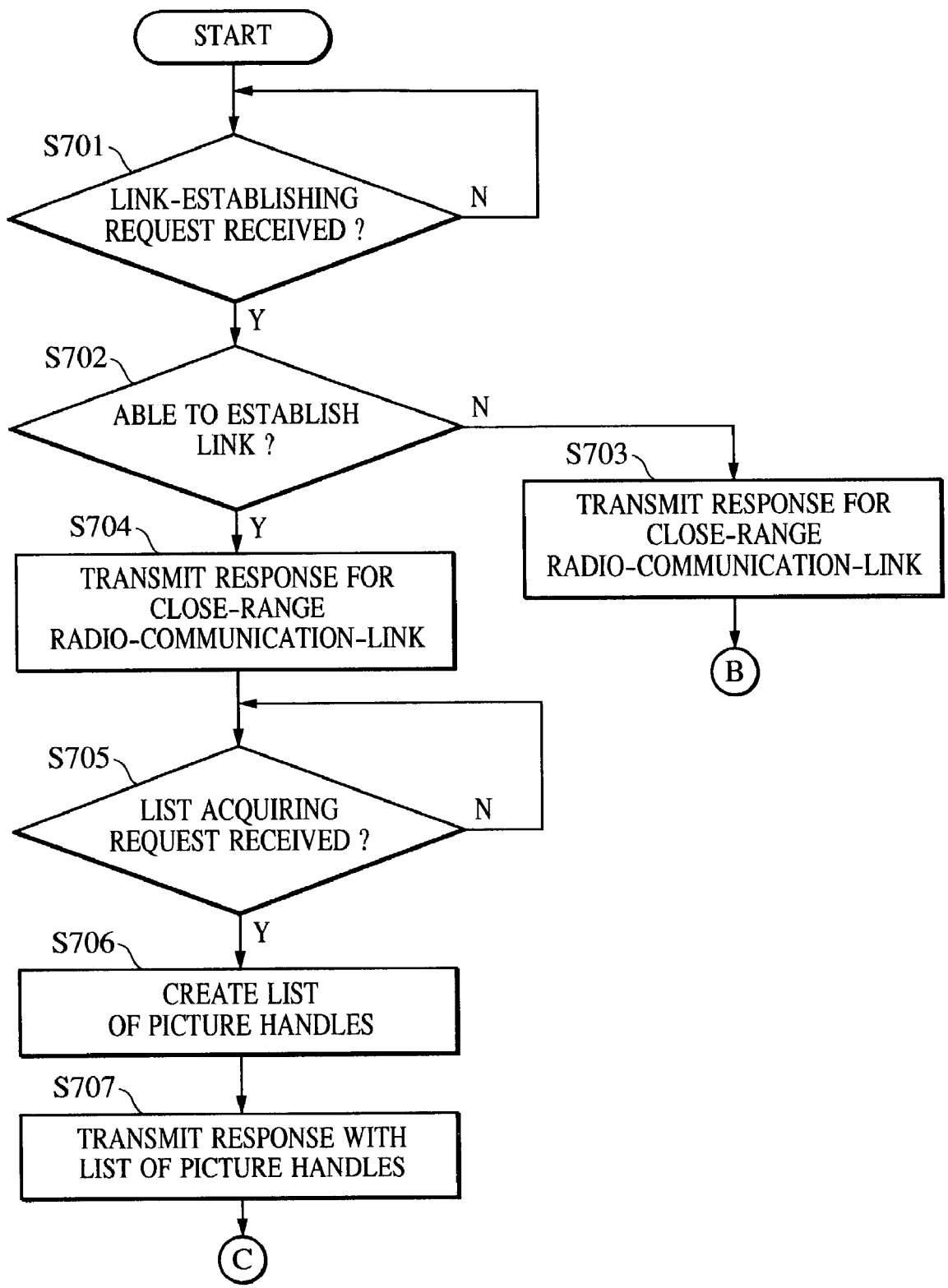
FIG. 11 is a flowchart showing an alias setting process of the image capturing device 100 shown in FIG. 3.
Figure 12:
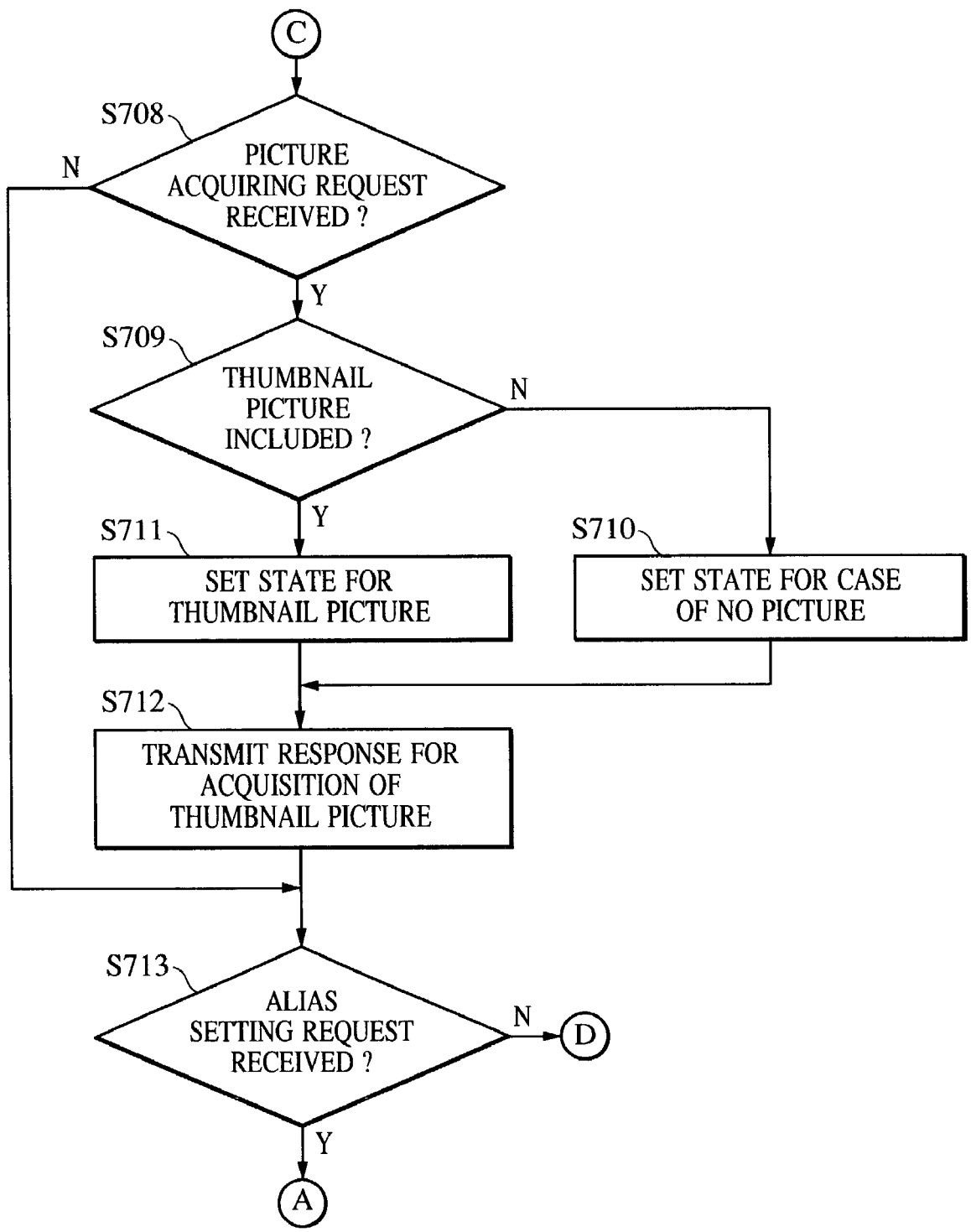
FIG. 12 is a flowchart continued from the flowchart in FIG. 11 which shows the alias setting process of the image capturing device 100 shown in FIG. 3.
Figure 13:
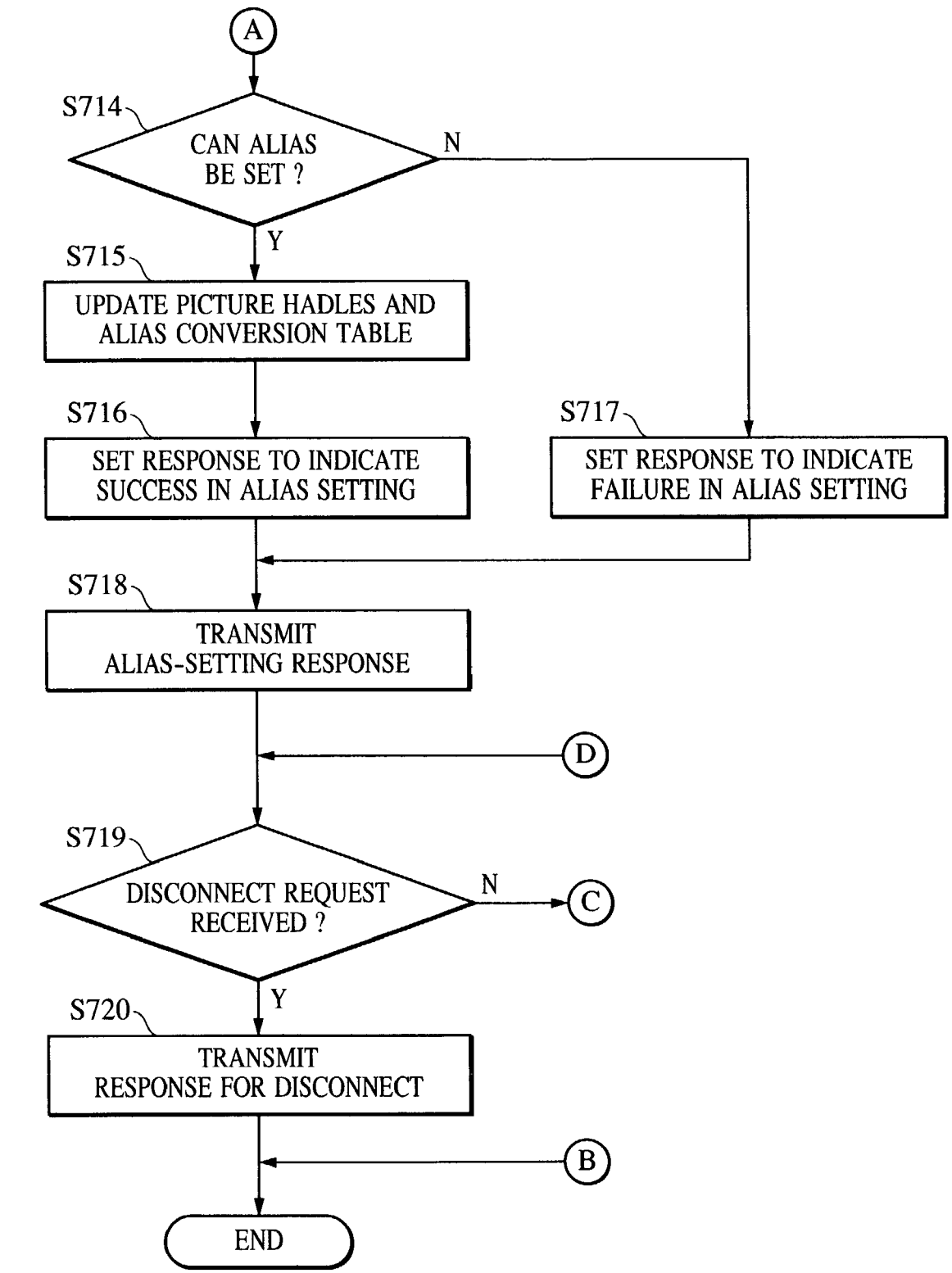
FIG. 13 is a flowchart continued from the flowchart in FIG. 12 which shows the alias setting process of the image capturing device 100 shown in FIG. 3.

FIGS. 11 to 13 are flowcharts showing the alias setting process of the image capturing device 100. The program of the alias setting process is stored in the memory 52 in the image capturing device 100 and is executed by the system control circuit 50. The system control circuit 50 is a computer for reading this program from the memory 52 and executing the read program. The memory 52 is a storage medium that stores the program so that it can be read by the system control circuit 50. The operation of the image capturing device 100 that executes the program under control of the system control circuit 50 is described below.

Figure 14:
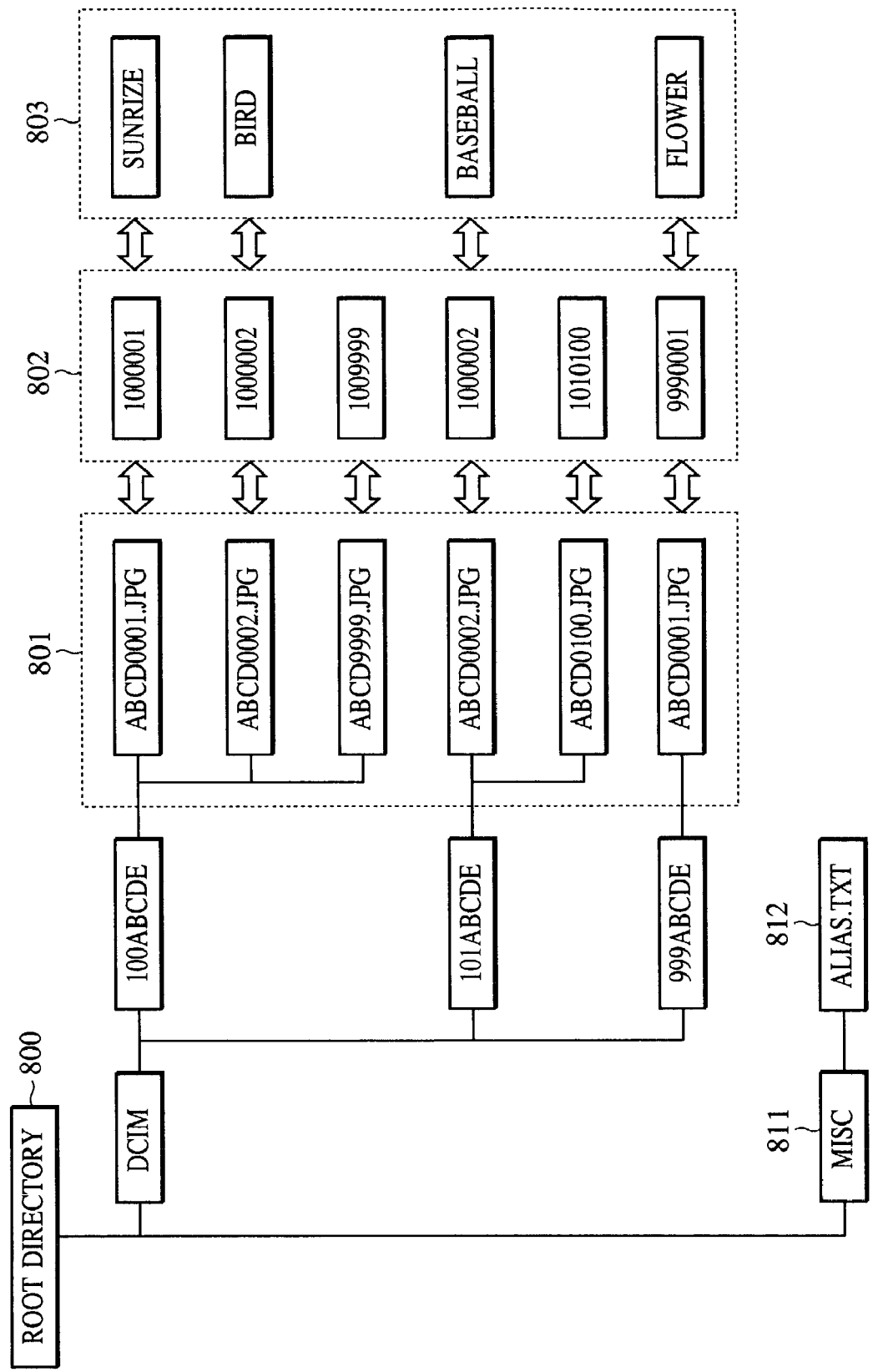
FIG. 14 is a block diagram showing a directory configuration of picture files in the image capturing device 100 shown in FIG. 3.

This embodiment describes a case in which the image capturing device 100 has six picture files 801 in a file system as shown in FIG. 14. In FIG. 14, directory names and picture files are generated in order in accordance with the rules of the DCF when pictures are captured, and are stored in the storage medium 120. The captured pictures are stored in the picture files 801.

A file 812 having a conversion table between each picture handle 802 and each alias 803 is stored, having the file name "ALIAS.TXT" in an MISC directory 811 under a root directory 800 in the file system shown in FIG. 14. In the file system shown in FIG. 14, those other than the picture handles 802 and the aliases 803 are stored in the recording unit 122 of the storage medium 120. The conversion file 812 is also stored in the recording unit 122.

FIG. 15 shows the contents of the conversion-table storage file 812 (ALIAS.TXT). FIG. 10 shows an example of a list 820 of picture handles generated based on the conversion-table storage file 812 by the image capturing device 100.

First, after the image capturing device 100 (picture storage device) uses the close-range radio-communication circuit 110 to receive a close-range radio-communication-link-establishing request from the picture display device 300 (data input device) (step S701), the image capturing device 100 verifies whether to link to the picture display device 300 (step S702). When the image capturing device 100 cannot link to the picture display device 300, it transmits, to the picture display device 300, a response to the link-establishing request which represents inability to establish the link (step S703), and terminates the process.

When it is verified in step S702 that the image capturing device 100 can establish the close-range radio-communication link, a response to the link-establishing request which represents completion of establishing the link is transmitted from the close-range radio-communication circuit 110 to the picture display device 300 (step S704).

After receiving a picture-handle-list acquiring request from the close-range radio-communication circuit 110 (step S705), the image capturing device 100 generates each picture handle 302 by, in accordance with the predetermined file system, retrieving and acquiring the picture file of a picture stored in the storage medium 120. The DCF directories and the DCF files 801 are stored in the storage medium 120. The image capturing device 100 generates each picture handle 802 (picture identification information) by combining the first to third characters (directory number) of each DCF directory name and the fifth to eighth characters (file number) of each DCF file name 801.

Next, based on the generated picture handle 802, the image capturing device 100 searches the conversion-table storage file 812 (ALIAS.TXT). When an alias corresponding to the generated picture handle 802 is set in the conversion-table file 812 (ALIAS.TXT), the image capturing device 100 generates the list 820 of picture handles by using the alias in place of the picture handle (step S706). After the list 820 of picture handles is generated, a response with the generated list 820 of picture handles is transmitted from the close-range radio-communication circuit 110 to the picture display device 300 (step S707). FIG. 10 shows an example of the list 820 of picture handles when pictures have the picture handles 802 and the aliases 803 shown in FIG. 14. If no picture is stored in the storage medium 120, a response with the list 820 having no content is transmitted from the image capturing device 100 to the picture display device 300.

This embodiment describes a form in which the list 820 of picture handles is generated in the image capturing device 100 when it receives the picture-handle list acquiring list from the picture display device 300. However, in another form, when the storage medium 120 is connected to the connector 127, and when a picture is stored in the storage medium 120, the list 820 of picture handles is generated and stored in the memory 30. When a picture is stored in the storage medium 120 when being captured, and no alias is set for the picture, the picture handle of the picture is recorded in the list 820 of picture handles.

After using the close-range radio-communication circuit 110 to receive a thumbnail-picture acquiring request from the picture display device 300 (step S708), the image capturing device 100 searches for the picture handle or alias designated in the acquiring request and verifies whether to contain a picture file including the designated picture handle or alias (step S709).

When the image capturing device 100 contains no picture file including the designated picture handle or alias, the image capturing device 100 sets a state in which there is not the designated file (step S711), and uses the close-range radio-communication circuit 110 to transmit the response to the acquiring request which is set in step S710 or S711 (step S712). Although the picture display device 300 requests for a thumbnail picture and the image capturing device 100 transmits the thumbnail picture, as described above, the picture display device 300 may request for a full size picture and the image capturing device 100 may transmit the full size picture.

After using the close-range radio-communication circuit 100 to receive an alias setting request from the picture display device 300 (step S713), the image capturing device 100 extracts a picture handle and its alias which are represented in the received alias setting request. By searching the handle-alias-conversion-table file 812, the image capturing device 100 verifies whether or not the file 812 includes the picture handle represented in the received alias setting request and whether or not the alias represented in the received alias setting request is used as an alias for another picture handle (step S714). When the file 812 includes the represented picture handle, and the represented alias is not used, the image capturing device 100 updates the handle-alias-conversion-table file 812 in response to the content of the received alias setting request (step S715).

By way of example, after receiving the alias setting request including the picture handle "1009999" and the alias "BIRTHDAY", the image capturing device 100 records the picture handle "1009999" and the alias "BIRTHDAY" in the file 812. This sets the alias "BIRTHDAY" for the picture having the picture handle "1009999" (the picture having the file name "ABCD9999" in the DCF directory "100ABCDE").

A picture for which an alias is set as described above is a full size picture or a thumbnail picture.

When the image capturing device 100 succeeds in setting the alias in step S714, it sets a response indicating success in alias setting (step S716). When the image capturing device 100 fails in setting the alias, it sets a response indicating failure in alias setting (step S717). After that, the image capturing device 100 transmits the response to the picture display device 300 (step S718).

After using the close-range radio-communication circuit 110 to receive a communication-link disconnect request from the picture display device 300 (S719), it transmits a response for disconnection from the close-range radio-communication circuit 110 to the picture display device 300 (step S720), and terminates the process.

The above picture-handle list request, the above alias setting request, and the above thumbnail picture acquiring request may be received any number of times after establishment of the close-range radio-communication link by receiving the close-range radio-communication link request in step S701 until the close-range radio-communication link is cut off by receiving the communication-link disconnect request in step S719. The order of steps for reception is not limited to the order in the above process.

After the above alias setting process, when the user uses the operation unit 362 of the picture display device 300 to display, on the display unit 324 of the picture display device 300, the list 820 of picture handles which is stored in the storage medium 120 of the image capturing device 100, the image capturing device 100 refers to the conversion table 812 stored in the storage medium 120, generates the list 820 of picture handles by, for a picture handle correlated with an alias, using the alias instead of the picture handle, and transfers the list 820 of picture handles to the picture display device 300. This displays the list 820 of picture handles, which includes the alias, on the display unit 324 of the picture display device 300.

In addition, when the user uses the operation unit 362 to select an alias from the list 820 of picture handles which is displayed on the display unit 324 of the picture display device 300, and requests for a thumbnail picture having the selected alias, the image capturing device 100 determines that a picture file of a picture handle corresponding to the alias is selected by using the conversion-table file 812, reads the picture of the selected picture file from the storage medium 120, and transmits the read picture to the picture display device 300 through the close-range radio-communication circuit 110. The picture display device 300 displays the received picture.

At this time, in one embodiment of the present invention, the alias and the picture are displayed on the display unit 324 so as to be correlated with each other.

As described above, the image capturing device 100 generates each picture handle 802 for designating each picture file 801 stored in the storage medium 120 in being loaded. When an alias corresponding to the picture handle 802 is recorded in the file 812, the alias is used instead of the picture handle 802, the list 820 of picture handles is generated. The image capturing device 100 transmits the list 820 of picture handles to the picture display device 300. The picture display device 300 displays the received list 820 of picture handles. The user uses the operation unit 362 of the picture display device 300 to input one alias 803 for one of the pictures in the list 820 of picture handles. The picture display device 300 transmits the input alias to the image capturing device 100, and the input alias is recorded in the file 812 of the storage medium 120 which is loaded into the image capturing device 100.

As described above, the alias is virtually treated as a picture file name in the picture display device 300, whereby the operability for picture viewing of the picture display device 300 can be improved.

Also, the image capturing device 100 has the conversion table 812 of picture handles and aliases separately from the picture files. Since the conversion-table file 812 is stored in a directory (e.g., MISC) having a directory name other than each DCF directory name below the root directory 800, the conversion table in the file 812 does not change the file system (the directories below the DCIM directory) for the image capturing device 100. Accordingly, when the storage medium 120 storing the conversion table 812 is connected to a device that does not use the conversion table in the file 812, and a picture stored in the storage medium 120 is played back, by reading the picture from the DCF files 801 stored in the DCF directories below the DCIM directory by using the picture handles 802, the read picture can be played back.

In the above-described embodiment, the list 820 of picture handles is displayed by the picture display device 300, and a picture for which an alias is set is selected. However, in another embodiment of the present invention, by using the display unit 28 of the image capturing device 100 to display the list 820 of picture handles, and using the operation unit 362 of the picture display device 300 to move a cursor on the display unit 28, a picture for an alias is set is selected. Also in this embodiment, the alias is input by using the operation unit 362 of the picture display device 300.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A picture storage device linkable to an external data input device, said picture storage device comprising:
  connecting means for connecting to a recording medium;
  transmitting means for transmitting a first list including picture identification information of picture data recorded in the recording medium to the external data input device;
  receiving means for receiving, from the external data input device, a selection signal for selecting the picture identification information from the first list and a picture name corresponding to the picture identification information selected by the selection signal; and
  recording means for recording the received picture name corresponding to the picture identification information into a conversion table in the recording medium,
  wherein said transmitting means transmits a second list in which the picture name replaces the picture identification information in the first list to the external data input device when the picture name corresponding to the picture identification information is recorded in the recording medium.

2. A picture storage device according to claim 1, wherein, when said receiving means receives picture identification information from the external data input device, said transmitting means transmits picture data corresponding to the received picture identification information to the external data input device, and wherein said recording means records the received picture name corresponding to the received picture identification information in the recording medium.

3. A picture storage device according to claim 1, wherein, when said receiving means receives the picture name from the external data input device, said transmitting means transmits a picture corresponding to the received picture name to the external data input device.

4. A picture storage device according to claim 1, wherein said recording means records the picture name in a second directory formed below a first directory, wherein the second directory and a third directory are formed below the first directory, and a fourth directory is formed below the third directory, and wherein a file of picture data is stored in the fourth directory, and the picture identification information is determined based on the name of the fourth directory and the name of the file of picture data.

5. A picture storage device according to claim 1, wherein said transmitting means and said receiving means connect to the external data input device by wireless communication.

6. A data recording program stored on a computer readable memory medium, the data recording program for a picture storage device connectable to a recording medium and linkable to an external data input device, said data recording program comprising code for the steps of:
 a first transmitting step of transmitting a first list including picture identification information of picture data recorded in the recording medium to the external data input device;
 receiving, from the external data input device, a selection signal for selecting the picture identification information from the first list and a picture name corresponding to the picture identification information selected by the selection signal; and
 recording the received picture name corresponding to the picture identification information into a conversion table in the recording medium,
 a second transmitting step of transmitting a second list in which the picture name replaces the picture identification information in the first list is transmitted to the external data input device when the picture name corresponding to the picture identification information is recorded in the recording medium.

7. A data recording program according to claim 6, further comprising code for a step of transmitting picture data corresponding to the picture identification information to the external data input device, when the picture identification information is received from the external data input device, and wherein the picture name is recorded in the recording medium in said recording step corresponding to the received picture identification information.

8. A data recording program according to claim 6, further comprising code for a step of transmitting a picture corresponding to a received picture name to the external input device.

9. A data recording program according to claim 6, wherein, in said recording step, the picture name is recorded in a second directory formed below a first directory, wherein the second directory and a third directory are formed below the first directory, and a fourth directory is formed below the third directory, and a file of picture data is stored in the fourth directory, and the picture identification information is determined based on the name of the fourth directory and the name of the file of picture data.

10. A data recording program according to claim 6, wherein, in said transmitting step and said receiving step, the picture storage device and the external data input device are connected by wireless communication.

11. A method for recording, into a picture storage device to which a recording medium is connected, data input from an external data input device, said method comprising the steps of:
 a first transmitting step of transmitting a first list including picture identification information of picture data recorded in the recording medium to the external data input device;
 receiving, from the external data input device, a selection signal for selecting the picture identification information from the first list and a picture name corresponding to the picture identification information selected by the selection signal; and
 recording the received picture name corresponding to the picture identification information into a conversion table in the recording medium,
 a second transmitting step of transmitting a second list in which the picture names replaces the picture identification information in the first list is transmitted to the external input device when the picture name corresponding to the picture identification information is recorded in the recording medium.

12. A recording method according to claim 11, further comprising a step of transmitting picture data corresponding to the picture identification information to the external data input device when the picture identification information is received from the external data input device, and wherein the picture name is recorded in the recording medium in said recording step corresponding to the received picture identification information.

13. A data recording method according to claim 11, further comprising a step of transmitting a picture corresponding to a received picture name to the external data input device.

14. A data recording method according to claim 11, wherein, in said recording step, the picture name is recorded in a second directory formed below a first directory, wherein the second directory and a third directory are formed below the first directory, and a fourth directory is formed below the third directory, and a file of picture data is stored in the fourth directory, and the picture identification information is determined based on the name of the fourth directory and the name of the file of picture data.

15. A data recording method according to claim 11, wherein, in said transmitting step and said receiving step, the picture storage device and the external data input device are connected by wireless communication.

* * * * *